Patented Nov. 11, 1952

2,617,809

UNITED STATES PATENT OFFICE 2,617,809

PROCESS FOR THE PREPARATION OF THE SULFURIC ACID SALT OF AMINONITROTHIAZOLES

Harold L. Hubbard, Webster Groves, and George W. Steahly, Maplewood, Mo., assignors to Monsanto Chemical Company, St. Louis, Mo., a corporation of Delaware No Drawing. Application September 28, 1950, Serial No. 187,352

14 Claims. (Cl. 260—306.8)

1

This invention relates to aminonitrothiazoles; more specifically, this invention relates to an improvement in the process for the production of aminonitrothiazoles.

The aminonitrothiazoles are of considerable interest as intermediates in the preparation of other organic compounds and as pharmaceuticals. The 2-amino-5-nitrothiazole has proven to be of considerable utility for the treatment of blackhead in turkeys. Heretofore, the aminonitrothiazoles have been prepared by the mixed acid nitration of an acylaminothiazole to form a reaction mixture containing acylaminonitrothiazole. The acylaminonitrothiazole was then separated from the reaction mixture and hydrolyzed with dilute hydrochloric acid to form the aminonitrothiazole hydrochloride which was then neutralized and aminonitrothiazole recovered. Because of the numerous steps involved in this synthesis, the preparation of aminonitrothiazoles according to this process has been exceedingly costly and time-consuming.

It is an object of this invention to provide an improvement in the process for the preparation of aminonitrothiazoles.

Other objects will become apparent from a description of the novel process of this invention.

It has now been discovered that excellent yields of substantially pure aminonitrothiazoles may be obtained by reacting an acylaminothiazole and a mixed acid to form a reaction mixture containing acylaminonitrothiazole and spent acid, preferably dilute, heating the reaction mixture thus obtained thereby converting the acylaminonitrothiazole to the sulfuric acid salt of aminonitrothiazole, and then neutralizing and recovering therefrom substantially pure aminonitrothiazole. It is obvious that such a process constitutes a significant improvement over that process heretofore used, and previously described, inasmuch as the separate and distinct operations of isolating the acylaminonitrothiazole and then hydrolyzing it with dilute hydrochloric acid have been eliminated. Carrying out the conversion of the acylaminonitrothiazole to the mineral acid salt of aminonitrothiazole within the reaction mixture in which the acylaminonitrothiazole is prepared, results in a significant reduction in the cost of the process and also a significant reduction in the time cycle.

The following examples are illustrative of the novel improved process of this invention:

Example I

Over a period of one to one and one-half hours, 50 g. of 2-acetylaminothiazole are added to 100 ml. of 100% sulfuric acid contained in 500 ml. flask equipped with an agitator and a thermometer while maintaining a temperature in the range of from 0° to about 15° C. With constant agitation, 16.5 ml. of 95% fuming nitric acid is added over a period of one hour, while maintaining a temperature in the range of from 5°–10° C.

After all of the reactants had been added, the batch is heated to 30° C. and held at approximately that temperature for a period of one-half hour. The reaction mixture thus obtained is then diluted with 600 ml. of water and boiled under reflux conditions for a period of one hour, after which time it is cooled rapidly to 20–25° C. and then filtered. The filtrate is neutralized by adding approximately 350 g. of sodium acetate and the precipitated 2-amino-5-nitrothiazole removed by filtration and washed with water. Approximately a 65% yield of 2-amino-5-nitrothiazole is obtained having a melting point of 197–198° C.

Example II

The procedure set forth in Example I is repeated utilizing in place of the 50 g. of 2-acetylaminothiazole, 51.5 g. of 2-propionylaminothiazole. An excellent yield of substantially pure 2-amino-5-nitrothiazole is obtained.

Example III

The procedure set forth in Example I is repeated utilizing in place of the 2-acetylaminothiazole, 72 g. of 2-benzoylaminothiazole. An excellent yield of substantially pure 2-amino-5-nitrothiazole is obtained.

Example IV

The procedure set forth in Example I is repeated utilizing in place of 50 g. of 2-acetylaminothiazole, 50 g. of 5-acetylaminothiazole. An excellent yield of substantially pure 5-amino-2-nitrothiazole is obtained.

While the preceding examples have illustrated several particular embodiments of the novel process of this invention, it will be obvious to those skilled in the art that the specific reactants and reaction conditions specified therein are subject to substantial variation without departing from the scope of this invention. Thus, for example, the ratio of sulfuric acid to nitric acid in the mixed acid utilized for the nitration of the acylaminothiazole may be varied over a wide range. The quantity of mixed acid utilized is preferably such that the nitric acid present therein is almost completely consumed in the formation of the mononitro derivative of the acylaminothiazole and that the resulting spent acid contains relatively minor quantities of unreacted nitric acid. The actual procedure for carrying out the reaction between the mixed acid and the acylaminothiazole may also be varied in several ways. The mixed acid may be prepared separately by mixing the desired proportion of nitric and sulfuric acid and then the premixed mixed acid reacted with the desired acylaminothiazole. Preferably, however, the acylaminothiazole is dissolved in a predetermined quantity of sulfuric acid and nitric acid added thereto. This procedure is illustrated in Example I.

The temperature at which the nitration reaction is carried out may be varied over a substantial range. It is particularly advantageous, however, to carry out this reaction of a temperature in the range of from about 0° C. to about 40° C.

Any acylaminothiazole may be utilized in the novel improved process of this invention. Typical, but not limitative, of the acyl derivatives which may be so nitrated, are the formyl, acetyl, propionyl, butyryl, benzoyl, etc., aminothiazoles. Similarly, any of the various isomeric acylaminothiazoles may be nitrated according to the novel process of this invention. Isomeric acylaminothiazoles are illustrated by the 2-acylaminothiazole, 4-acylaminothiazole and 5-acylaminothiazole.

The reaction mixture obtained by the above described nitration of acylaminothiazole contains acylaminonitrothiazole dissolved in spent acid. The acylaminonitrothiazole contained therein may then be hydrolyzed to the sulfuric acid salt of aminonitrothiazole by merely heating the reaction mixture. It has been found that this hydrolysis reaction proceeds most favorably when the concentration of the sulfuric acid in the reaction mixture is in the range of from about 1% to about 50% $H_2SO_4$ by weight of total composition. This preferred concentration of sulfuric acid in the reaction mixture resulting from the mixed acid nitration of acylaminothiazole may be obtained either by diluting the reaction mixture with water subsequent to the nitration reaction, or by using a concentration of sulfuric acid in the mixed acid such that the concentration of sulfuric acid in the resultant reaction mixture subsequent to the nitration reaction is in the range of from about 1% to about 50% by weight. While the temperature at which this hydrolysis reaction is carried out may be varied over a wide range, it is preferably carried out by boiling the reaction mixture under reflux conditions.

At times this reaction mixture exhibits a tendency to foam during this hydrolysis reaction. This foaming may be eliminated or significantly reduced by the addition of various types of surface active agents. Typical agents which may be so utilized are the alkyl aryl sulfonates, such as sodium dodecylbenzenesulfonate and dioctyl sodium sulfosuccinate.

After the acylaminonitrothiazole has been converted into the sulfuric acid salt of aminonitrothiazole, the aminonitrothiazole may be recovered from the reaction mixture by any method well known to those skilled in the art, such as by neutralization of the reaction mixture with sodium acetate or sodium hydroxide, precipitating therefrom aminonitrothiazole which may be filtered and, if desired, further refined.

What is claimed is:

1. In a process for the preparation of the sulfuric acid salt of aminonitrothiazoles, the steps comprising reacting an acylaminothiazole and a mixture of nitric and sulfuric acids to form a reaction mixture containing spent sulfuric acid and acylaminonitrothiazole, and converting the acylaminonitrothiazole to the sulfuric acid salt of aminonitrothiazole by heating the reaction mixture thus obtained.

2. In a process for the preparation of the sulfuric acid salt of aminonitrothiazoles, the steps comprising reacting an acylaminothiazole and a mixture of nitric and sulfuric acids to form a reaction mixture containing dilute spent sulfuric acid and acylaminonitrothiazole, and converting the acylaminonitrothiazole to the sulfuric acid salt of aminonitrothiazole by heating the reaction mixture thus obtained.

3. In a process for the preparation of the sulfuric acid salt of aminonitrothiazoles, the steps comprising reacting an acylaminothiazole and a mixture of nitric and sulfuric acids to form a reaction mixture containing acylaminonitrothiazole and dilute spent sulfuric acid, the concentration of the sulfuric acid in said reaction mixture being in the range of from about 1% to about 50% by weight of total composition, and converting the acylaminonitrothiazole to the sulfuric acid salt of aminonitrothiazole by heating the reaction mixture.

4. In a process for the preparation of the sulfuric acid salt of aminonitrothiazoles, the steps comprising reacting an acylaminothiazole and a mixture of nitric and sulfuric acids to form a reaction mixture containing acylaminonitrothiazole and dilute spent sulfuric acid, the concentration of the sulfuric acid in said reaction mixture being in the range of from about 1% to about 50% by weight of total composition, and converting the acylaminonitrothiazole to the sulfuric acid salt of aminonitrothiazole by boiling the reaction mixture under reflux conditions.

5. In a process for the preparation of the sulfuric acid salt of 2-amino-5-nitrothiazole, the steps comprising reacting 2-acylaminothiazole and a mixture of nitric and sulfuric acids to form a reaction mixture containing 2-acylamino-5-nitrothiazole and dilute spent sulfuric acid, the concentration of the sulfuric acid in said reaction mixture being in the range of from about 1% to about 50% by weight of total composition, and converting the 2-acylamino-5-nitrothiazole to the sulfuric acid salt of 2-amino-5-nitrothiazole by boiling the reaction mixture under reflux conditions.

6. The process as described in claim 5 wherein the 2-acylaminothiazole is 2-acetylaminothiazole.

7. The process as described in claim 5 wherein the 2-acylaminothiazole is 2-propionylaminothiazole.

8. In a process for the preparation of the sulfuric acid salt of aminonitrothiazoles, the steps comprising reacting an acylaminothiazole and a mixture of nitric and sulfuric acids to form a reaction mixture containing spent sulfuric acid and acylaminonitrothiazole, diluting said reaction mixture with water and converting the acylaminonitrothiazole to the sulfuric acid salt of aminonitrothiazole by heating the reaction mixture.

9. In a process for the preparation of the sulfuric acid salt of aminonitrothiazoles, the steps comprising reacting an acylaminothiazole and a mixture of nitric and sulfuric acids to form a reaction mixture containing spent sulfuric acid and acylaminonitrothiazole, diluting said reaction mixture with water until the concentration of sulfuric acid in said reaction mixture is in the range of from about 1% to about 50% by weight of total composition, and converting the acylaminonitrothiazole to the sulfuric acid salt of aminonitrothiazole by heating the reaction mixture.

10. In a process for the preparation of the sulfuric acid salt of aminonitrothiazoles, the steps comprising reacting an acylaminothiazole and a mixture of nitric and sulfuric acids to form a reaction mixture containing spent sulfuric acid and acylaminonitrothiazole, diluting said reaction mixture with water until the concentration of sulfuric acid in said reaction mixture is in the range of from about 1% to about 50% by weight of total composition, and converting the acylaminonitrothiazole to the sulfuric acid salt of aminonitrothiazole by boiling the reaction mixture under reflux conditions.

11. In a process for the preparation of the sulfuric acid salt of 2-amino-5-nitrothiazole, the steps comprising reacting 2-acylaminothiazole and a mixture of nitric and sulfuric acids to form a reaction mixture containing spent sulfuric acid and 2-acylamino-5-nitrothiazole, diluting said reaction mixture with water until the concentration of sulfuric acid in the reaction mixture is in the range of from about 1% to about 50% by weight of total composition, and converting the 2-acylamino-5-nitrothiazole to the sulfuric acid salt of 2-amino-5-nitrothiazole by heating the reaction mixture.

12. In a process for the preparation of the sulfuric acid salt of 2-amino-5-nitrothiazole, the steps comprising reacting 2-acylaminothiazole and a mixture of nitric and sulfuric acids to form a reaction mixture containing spent sulfuric acid and 2-acylamino-5-nitrothiazole, diluting said reaction mixture with water until the concentration of sulfuric acid in the reaction mixture is in the range of from about 1% to about 50% by weight of total composition, and converting the 2-acylamino-5-nitrothiazole to the sulfuric acid salt of 2-amino-5-nitrothiazole by boiling the reaction mixture under reflux conditions.

13. The process as described in claim 12 wherein the 2-acylaminothiazole is 2-acetylaminothiazole.

14. The process as described in claim 12 wherein the 2-acylaminothiazole is 2-propionylaminothiazole.

HAROLD L. HUBBARD.
GEORGE W. STEAHLY.

REFERENCES CITED

The following references are of record in the file of this patent:

Chemical Abstracts, vol. 40, pp. 4056–4060, citing Ganapathi et al., Proc. Indian Acad. Sci. 22A 343–358 (1945).